US012732856B2

(12) United States Patent
Ahmed

(10) Patent No.: US 12,732,856 B2
(45) Date of Patent: Sep. 8, 2026

(54) BATCH SCHEDULING OF RADIO NODE CLUSTERS FOR FIRMWARE SCHEDULER

(71) Applicant: Rakuten Symphony, Inc., Tokyo (JP)

(72) Inventor: Tasnim Ahmed, Tokyo (JP)

(73) Assignee: RAKUTEN SYMPHONY, INC., Tokyo (JP)

(*) Notice: Subject to any disclaimer, the term of this patent is extended or adjusted under 35 U.S.C. 154(b) by 301 days.

(21) Appl. No.: 18/644,112

(22) Filed: Apr. 24, 2024

(65) Prior Publication Data

US 2025/0338164 A1 Oct. 30, 2025

(51) Int. Cl.

| | |
|---|---|
| ***G06F 8/60*** | (2018.01) |
| ***H04W 28/02*** | (2009.01) |
| ***H04W 72/0446*** | (2023.01) |
| ***H04W 72/56*** | (2023.01) |
| *H04L 67/00* | (2022.01) |

(52) U.S. Cl.

CPC ... *H04W 28/0263* (2013.01); *H04W 72/0446* (2013.01); *H04W 72/56* (2023.01); *H04L 67/34* (2013.01)

(58) Field of Classification Search

CPC ......... A61N 1/37264; G06F 3/12; G06F 8/60; G06F 8/65; G06F 9/445; H04L 67/34; H04L 25/0254; H04L 25/03165; H04L 2012/5686; H04L 2025/03464; H04L 41/145; H04L 41/16; H04L 45/08; H04M 1/72406; H04N 2005/44374; H04N 21/42226; H04N 21/4586; H04W 8/245; H04W 28/02; H04W 28/0231; H04W 28/0263; H04W 72/0446; H04W 72/12; H04W 72/1263; H04W 72/50; H04W 72/54; H04W 72/56; H04W 16/22; G06N 3/02; G06N 3/042; G06N 3/044; G06N 3/0442; G06N 3/045; G06N 3/0455; G06N 3/0464; G06N 3/0499; G06N 3/08; G06N 3/088; G06N 3/09; G06N 3/091; G06N 3/092; G06N 20/00; G06N 20/10; H04B 17/3912; H04B 17/3913

See application file for complete search history.

(56) References Cited

U.S. PATENT DOCUMENTS

| | | | | |
|---|---|---|---|---|
| 8,677,343 | B2 * | 3/2014 | Averbuch | G06F 8/654 717/170 |
| 8,881,132 | B2 * | 11/2014 | Mopur | G06F 3/0632 717/176 |
| 12,020,017 | B2 * | 6/2024 | Subramaniam | H04L 45/38 |
| 12,143,263 | B2 * | 11/2024 | Bhangu | H04L 41/0803 |
| 2018/0167277 | A1 * | 6/2018 | Mahimkar | H04L 41/082 |
| 2018/0189046 | A1 * | 7/2018 | Kunisetty | H04L 67/34 |
| 2020/0026505 | A1 * | 1/2020 | Olderdissen | G06F 9/44526 |
| 2025/0220457 | A1 * | 7/2025 | Gaurav | H04L 41/16 |
| 2025/0254532 | A1 * | 8/2025 | Shrivastava | H04W 24/02 |

* cited by examiner

*Primary Examiner* — Frank Duong

(74) *Attorney, Agent, or Firm* — HAUPTMAN HAM, LLP

(57) ABSTRACT

A highest priority batch is selected, based on a hotspot count, from a list of unassigned batches, wherein each batch includes one or more nodes in a telecommunication network. A highest priority timeslot is selected, based on batch traffic and batch connected subscriber count, for the highest priority batch. The highest priority timeslot is assigned to the highest priority batch. Implementation of an action for each of the one or more nodes in the highest priority batch during the highest priority timeslot is automatically scheduled.

20 Claims, 4 Drawing Sheets

400

BATCH SCHEDULING OF RADIO NODE CLUSTERS FOR FIRMWARE SCHEDULER

TECHNICAL FIELD

This description relates to batch scheduling of radio node clusters for a firmware scheduler.

BACKGROUND

A radio access network (RAN) is part of a telecommunication system and implements radio access technology. RANs reside between a device, such as a mobile phone, a computer, or remotely controlled machine, and provide connection with a core network (CN). Depending on the standard, mobile phones and other wireless connected devices are varyingly known as user equipment (UE), terminal equipment (TE), mobile station (MS), and the like.

Centrally controlling networks has been shown to add value for network operators. Firmware updates are often performed periodically or based on triggers. During a firmware update, a radio node is disconnected from a network. Therefore, bulk firmware updates that are performed by randomly selecting radio-nodes, e.g., Virtualized Central Units (VCUs) or Open CUs, for a given area results in catastrophic scenarios. Examples of such catastrophic scenarios include coverage blackout, a steep drop in handover success, or the like.

SUMMARY

In some embodiments, a method includes selecting a highest priority batch, based on a hotspot count, from a list of unassigned batches, wherein each batch includes one or more nodes in a telecommunication network. A highest priority timeslot is selected, based on batch traffic and batch connected subscriber count, for the highest priority batch. The highest priority timeslot is assigned to the highest priority batch. Implementation of an action for each of the one or more nodes in the highest priority batch during the highest priority timeslot is automatically scheduled.

In some embodiments, an apparatus is configured to select a highest priority batch, based on a hotspot count, from a list of unassigned batches, wherein each batch includes one or more nodes in a telecommunication network. A highest priority timeslot is selected, based on batch traffic and batch connected subscriber count, for the highest priority batch; and assign the highest priority timeslot to the highest priority batch. Implementation of an action for each of the one or more nodes in the highest priority batch during the highest priority timeslot is automatically scheduled.

In some embodiments, a non-transitory computer-readable media having computer-readable instructions stored thereon, which when executed perform operations to select a highest priority batch, based on a hotspot count, from a list of unassigned batches. Each batch includes one or more nodes in a telecommunication network. A highest priority timeslot is selected, based on batch traffic and batch connected subscriber count, for the highest priority batch. The highest priority timeslot is assigned to the highest priority batch. Implementation of an action for each of the one or more nodes in the highest priority batch during the highest priority timeslot is automatically scheduled.

BRIEF DESCRIPTION OF THE DRAWINGS

Features, aspects, and advantages of certain exemplary embodiments of the disclosure will be described below with reference to the accompanying drawings, in which like reference numerals denote like elements, and wherein.

DETAILED DESCRIPTION

Figure 1:
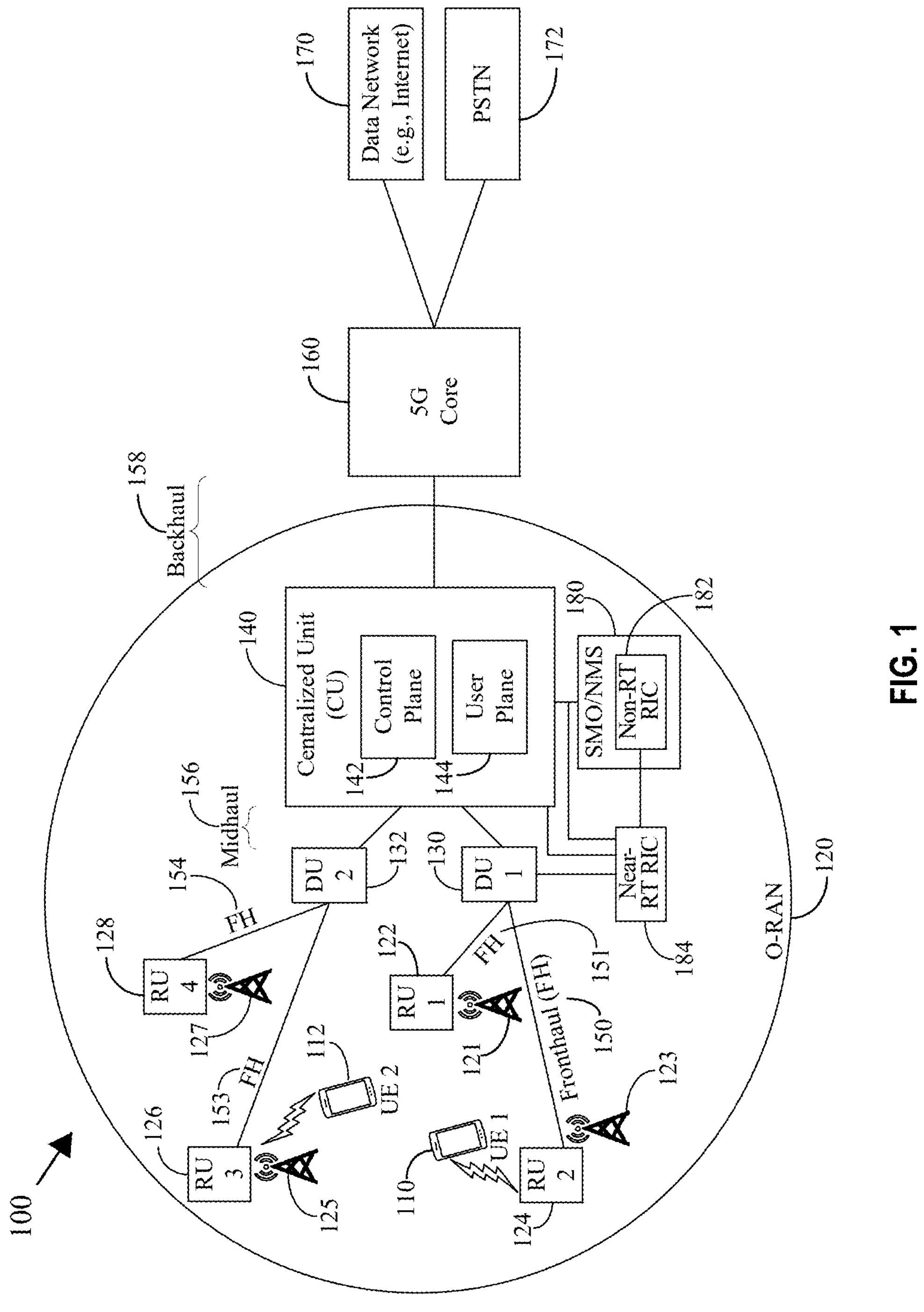
FIG. 1 is a pictorial diagram of a mobile network in accordance with some embodiments.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched, as long as these modifications may not affect the resulting scope of the invention.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]", "[A] and/or [B]", or "at least one of [A] or [B]" are to be understood as including only A, only B, or both A and B.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, data-streaming, or signaling-streaming. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB), "home access point (HAP)," "node", or the like refer to a wireless network component or apparatus that serves and receives data, control, voice, video, sound, gaming, data-streaming or signaling-streaming from a UE.

The foregoing disclosure provides illustration and description but is not intended to be exhaustive or to limit the implementations to the precise form disclosed. Modifications and variations are possible in light of the above disclosure or may be acquired from practice of the implementations.

A smart scheduler prepares for automatic bulk/batchwise radio-node software/firmware updates and other maintenance activities. Firmware is a class of computer software that provides low-level control for a device's hardware. Firmware, such as the basic input output system (BIOS) of a personal computer, contains basic functions of a device, and provides hardware abstraction services to higher-level software such as operating systems. For less complex devices, firmware acts as the device's complete operating system, performing control, monitoring, and data manipulation functions. Typical examples of devices containing firmware are embedded systems (running embedded software), home and personal-use appliances, computers, and computer peripherals. Firmware is held in non-volatile memory devices such as read-only memory (ROM), erasable programmable read-only memory (EPROM), electrically erasable programmable read-only memory (EEPROM), and flash memory. Updating firmware requires ROM integrated circuits to be physically replaced, or EPROM or flash memory to be reprogrammed through a procedure. Common reasons for updating firmware include fixing bugs or adding features.

The scheduler is able to provide advantages including reducing the impact on network coverage area by, for example, utilizing the neighboring nodes, maintaining handover success rates among radio-nodes, e.g., handover success rates close to a pre-schedule period, minimizing a reduction of internet protocol (IP) network traffic by shutting down nodes at a time when the throughput is a minimum, updating nodes while the least number of users are connected, and ensuring adequate coverage and handover support for the high priority nodes, e.g., nodes that very-important people (VIP's) or many subscribers are connected.

A smart scheduler provides automatic bulk/batchwise scheduling of software upgrades for radio nodes. During software updates or maintenance activity for the radio nodes (e.g., those nodes scheduled for an update or maintenance activity) inside a coverage area, e.g., 1000 VCUs, O-CUS, or other telecommunication devices inside an area, field engineers manually shut down one or two devices inside a small area and do not switch off other nodes close to the shutdown devices so that there is no significant impact on the consumers, e.g., no coverage blackout inside that area.

Currently there is no system that automatically resolves the issues that call for consideration. For example, knowing the coverage area affected in response to a network operator shutting down a node. Other issues include knowing what percentage of the coverage area is unavailable, whether handovers to a nearby node continue without interruption, is the IP traffic for the affected area or the uplink and downlink data traffic of the area handled by the current remaining nodes inside that area, are devices close to the effected nodes unable to be handed over to other nodes, what are the number of nodes affected, and what is the portion of the area that is affected.

The smart scheduler takes these consideration issues and automatically attempts to make a schedule of automatic software updates that are to be executed at one time. At any instance, there is always a balance. While affecting some consumers is acceptable, large-scale impact to consumers is to be avoided. The smart scheduler is to keep the impact to the system and customers significantly low or manageable. Node network coverage area affected is minimized and the handover success rate among the radio nodes is maintained, the reduction of IP network traffic is minimized by updating nodes while the least number of users are connected. A timeslot during the day is to be selected where the least number of users are connected, and adequate coverage is ensured. Handover support for high priority nodes is further ensured. For example, in response to the updated node involving a crowed public place or there are VIP's at the location, e.g., hotspots. More emphasis is to be given to those points.

The smart scheduler includes a first layer for monitoring applications such as radio nodes, e.g., node coverage monitors and radio node status monitors. A layer is a generalization of a conceptual model or algorithm, away from any implementation. These generalizations arise from broad similarities that are encapsulated by models that express similarities present in various implementations. The simplification provided by a good abstraction layer allows for easy reuse by distilling a useful concept or design pattern so that situations where applying accurately the useful concept or design pattern are quickly recognized. A layer is on top of another in response to the layer depending on the other. Each layer exists without the layers above, and calls for the layers below the layer to function.

Information is collected from the coverage monitor, such as the coverage information and handover information. The status monitor collects connected subscriber count and traffic statistics.

Collected node data and clustering parameters are useable to perform node clustering operations. The clustering operation handles the clustering of the radio nodes in a particular area in a way that each batch is to be shut down at once without significant impact, such as causing a coverage area blackout or other service issue. The nodes that are to be shutdown are identified and clustered together.

The node clustering operations involve a batch recommendation module that determines a neighbor of each node for compensation based on coverage, handover, and hotspots. Neighbor sequencing is performed to prioritize gain in collective coverage. The smart scheduler is configured to use artificial intelligence (AI) to reduce the impact on network coverage, handover success, IP network traffic, and connected subscribers. For example, AI is used for sequencing neighbor nodes for choosing the compensator (neighbor) node. In response to a node shutting down, compensating neighbor nodes that are close and capable of minimizing that shutdown are identified. AI ranks the neighbors in terms of their compensating capacity. The clustering operation performs agglomerative hierarchical clustering based on an unsupervised machine learning (ML) algorithm to select compensating neighboring nodes for nodes shut down during the firmware upgrade and provide maximum coverage and handover.

Hierarchical clustering (also called hierarchical cluster analysis or HCA) is a method of cluster analysis that seeks to build a hierarchy of clusters. Agglomerative is a "bottom-up" approach where each observation starts in its own cluster, and pairs of clusters are merged as one moves up the hierarchy. Unsupervised learning is a type of algorithm that learns patterns from untagged data. Through mimicry a machine is forced to build a concise representation of its world and then generate imaginative content. In contrast to supervised learning where data is tagged by an expert, unsupervised methods exhibit self-organization that captures patterns as probability densities or a combination of neural feature preferences encoded in the machine's weights and activations. The other levels in the supervision spectrum are reinforcement learning where the machine is given only a numerical performance score as guidance, and semi-supervised learning where a small portion of the data is tagged.

The neighbor sequencing receives a node list, identifies neighbor nodes to each node, and sequences or sorts neighbor nodes according to a combined coverage capacity. Net collective coverage ratio, average handover success rate, and total handover attempt ratio are determined. Estimates for determining collective neighbor compensation are performed using the net collective coverage ratio, average handover success rate, and total handover attempt ratio. The collective neighbor compensation is based on a weighted average of the net collective coverage ratio, average handover success rate, and total handover attempt ratio, wherein the collective coverage ratio is weighted at 70%, the average handover success rate is weighted at 20%, and the handover attempt ratio is weighted at 10%. A compensation risk is determined based on the collective neighbor compensation. Batch distribution is performed to identify a batch of source nodes for updating the firmware based on the compensation risk.

In some embodiments, a scheduling operation determines a schedule for upgrading radio node clusters that provide a minimal impact on data traffic and connected subscribers. The smart scheduler performs a scheduling operation using AI to calculate a scheduling duration by forecasting traffic and a subscriber count for nodes based on historical time series data. The smart scheduler prioritizes the traffic and subscriber count for individual clusters, so the scheduler assigns a timeslot to that cluster with the least number of subscribers and least amount of traffic. The smart scheduler determines a timeslot for each batch. The smart scheduler performs risk assessment to minimize scheduling risk and determines how efficiently the smart scheduler performs an update based on performance metrics. In the scheduling operations, timeslots for each batch are ranked based on the forecast traffic volume and subscriber count for each node in the batch. A highest priority batch is selected based on the hotspot count. Timeslots that are compatible for the batch are identified based on a batch schedule criteria. A highest priority compatible timeslot having the lowest number of allocated batches is selected. Then, the selected highest priority compatible timeslot is assigned to the highest priority batch. Hotspots are prioritized to determine a scheduled timeslot having the lowest traffic and to provide additional coverage for the prioritized nodes.

After completion of the scheduling operation, clustering output is produced by the clustering operation, scheduling output is produced by the scheduling operation, and map visualization is produced by the clustering output and the scheduling operation. Geo analytics is useable to provide maximum collective coverage. The geographic map is checked for a radio node coverage area to determine the collective coverage capacity of multiple nodes to compensate for a particular node. The geographic map provides performance statistics and map visualization associated with node device performance, batchwise performance, and overall performance.

In some embodiments, a smart scheduler provides automatic batchwise scheduling of firmware or software upgrades for radio nodes. In some embodiments, a batch scheduling algorithm provides automatic batchwise scheduling of radio nodes for a firmware or software upgrade. Certain criteria are usable to ensure optimal scheduling of the batches during the scheduling process.

In some embodiments, the criteria include one or more of (1) assign each batch to a timeslot having minimum traffic and connected subscribers, to ensure the impact of shutting a batch down is reduced to a minimum; (2) multiple primary batches (e.g., batch distribution algorithm recommended batches after a node clustering operation) are unable to overlap at the same timeslot; (3) multiple secondary batches (e.g., primary batches halved until a target number of secondary batches (e.g., based on user-selected increase in batch number) is reached) are able to overlap at the same timeslot; (4) batches are sequentially prioritized based on their corresponding hotspot-count (e.g., the more hotspots the higher the priority); (5) sequentially prioritizing the non-allocated timeslots for each batch based on traffic and connected subscriber count, where the lower the traffic and subscriber count, the higher the priority; (6) in response to multiple primary batches competing for the same preferable timeslot (e.g., the lowest traffic and connected subscriber count for each of the multiple primary batches), then the batch with the highest hotspot count is automatically prioritized.

In some embodiments, a scheduling performance indicator provides a quantitative number indication comparing the allocated timeslots (e.g., based on satisfying the scheduling criteria) to the corresponding target timeslots (e.g., having the lowest traffic and connected subscriber count) for each batch.

In some embodiments, to allocate a scheduled timeslot for each batch, a scheduling algorithm assigns fixed duration (e.g., 15 minutes) timeslots to the batches (e.g., with 25 batches the fixed duration is 375 minutes), prioritized based on the total number of hotspots for each batch. The timeslots to be allocated for a batch are prioritized based on two parameters (1) connected subscriber count, and (2) traffic volume. Thus, batches are sequentially prioritized based on hotspot count, while timeslots are prioritized based on connected subscriber count, and traffic volume based on each batch to be scheduled. Further, a batch with the greater hotspot count has the first pick of the timeslots. The batch with the second most hotspots has the next pick of the timeslots, but is unable to take the timeslot of the batch with the greater hotspot count (based on the criteria discussed above).

In some embodiments, traffic and subscriber counts are forecasted with AI/ML. In response to a firmware or software scheduling start time and total number of timeslots input through a user interface (UI), a scheduling duration is determined. A ML model forecasts the traffic and subscriber count for radio nodes based on historical time series data. The batchwise traffic and subscriber count is determined by aggregating historical time series data for a nodewise (e.g., for each node) forecasted output from the AI/ML model.

In some embodiments, ranking timeslots for each batch includes the timeslots being ranked in descending order based on traffic level and subscriber count. Then, a scheduling algorithm is applied to assign the possible timeslot to each batch. The scheduling algorithm ensures that the timeslots fulfill the batch schedule criteria for an individual batch.

In a non-limiting example, the scheduling algorithm selects the highest priority batch based on the hotspot count for the batch. Timeslots are filtered for compatibility with the batch based on the batch schedule criteria. The scheduling algorithm selects the highest priority compatible timeslot. The selected timeslot is then assigned to that batch. The scheduling algorithm inquires as to whether any batches remain without a timeslot. In response to batches remaining without a timeslot, the algorithm repeats the iterative process. In response to no batches remaining without a timeslot, the algorithm terminates.

In some embodiments, a determination of the scheduling performance provides an indicator of how close the allocated timeslots (e.g., based on the batch scheduling algorithm) are compared to the corresponding target timeslots (e.g., the timeslot with the lowest traffic and connected subscribers) for each batch. The rank of the allocated timeslots is used to estimate this scheduling performance. Mathematically expressed as the average of the timeslot rank-ratio of all batches.

Timeslot rank ratio (TSRR) for a batch is expressed as:

$$TSRR_{Batch} = \frac{\text{Rank}_{Allocated\ Timeslot}}{\text{Rank}_{Least\ Priority\ Timeslot}}$$

Where, schedule risk is expressed as:

$$\text{Schedule Risk} = \frac{\sum_{n=1}^{M\ Batches} (TSRR_n)}{M}$$

The schedule performance is expressed as:

$$\text{Schedule Performance} = 1 - \text{Schedule Risk}$$

Smart scheduler includes AI/ML techniques for an automated scheduling approach for radio node software upgrade or maintenance. The smart scheduler includes network data such as traffic, subscriber count, coverage area, and handover key performance indicators (KPIs) to present the automatic scheduling task as an analytical problem. Smart scheduler provides automatic batchwise software updates using state of the art data analytics and machine learning technologies.

FIG. 1 illustrates a mobile network 100 in accordance with some embodiments.

In FIG. 1, UE 1 (User Equipment 1) 110 and UE 2 112 access Mobile Network 100 via a Radio Access Network (RAN) 120.

RAN 120 includes Radio Towers 121, 123, 125, and 127. Radio Towers 121, 123, 125, 127 are associated with RU (Radio Unit) 1 122, RU 2 124, RU 3 126, and RU 4 128, respectively.

RU 1 122, RU 2 124, RU 3 126, RU 4 128 handle the Digital Front End (DFE) and the parts of the PHY layer, as well as the digital beamforming functionality. RU 1 122 and RU 2 124 are associated with Distributed Unit (DU) 1 130, and RU 3 126 and RU 4 128 are associated with DU 2 132. DU 1 130 and DU 2 132 are responsible for real time Layer 1 and Layer 2 scheduling functions. For example, in 5G, Layer-1 is the Physical Layer, Layer-2 includes the Media Access Control (MAC), Radio link control (RLC), and Packet Data Convergence Protocol (PDCP) layers, and Layer-3 (Network Layer) is the Radio Resource Control (RRC) layer. Layer 2 is the data link or protocol layer that defines how data packets are encoded and decoded, how data is to be transferred between adjacent network nodes. Layer 3 is the network routing layer and defines how data moves across the physical network.

DU 1 130 is coupled to the RU 1 122 and RU 2 124, and DU 2 132 is coupled to RU 3 126 and RU 4 128. DU 1 130 and DU 2 132 run the RLC, MAC, and parts of the PHY layer. DU 1 130 and DU 2 132 include a subset of the eNB/gNB functions, depending on the functional split option, and operation of DU 1 130 and DU 2 132 are controlled by Centralized Unit (CU) 140. CU 140 is responsible for non-real time, higher L2 and L3. Server and relevant software for CU 140 is hosted at a site or is hosted in an edge cloud (datacenter or central office) depending on transport availability and the interface for the Fronthaul connections 150, 151, 153, 154. The server and relevant software of CU 140 is further co-located at DU 1 130 or DU 2 132 or is hosted in a regional cloud data center.

CU 140 handles the RRC and PDCP layers. The gNB includes CU 140 and one or more DUs, e.g., DU 1 130, connected to CU 140 via Fs-C and Fs-U interfaces for a Control Plane (CP) 142 and User Plane (UP) 144, respectively. CU 140 with multiple DUs, e.g., DU 1 130, and DU 2 132, support multiple gNBs. The split architecture enables a 5G network to utilize different distribution of protocol stacks between CU 140, and DU 1 130 and DU 2 132, depending on network design and availability of the Midhaul 156. While two connections are shown between CU 140 and DU 1 130 and DU 2 132, CU 140 implements additional connections to other DUs. CU 150, in 5G, implements, for example, 256 endpoints or DUs. CU 140 supports the gNB functions such as transfer of user data, mobility control, RAN sharing (MORAN), positioning, session management, and the like. However, one or more functions are allocated to the DU. CU 140 controls the operation of DU 130 and DU 132 over the Midhaul interface 156.

Backhaul 158 connects the 4G/5G Core 160 to the CU 140. In some embodiments, core 160 is, for example, up to 200 km away from the CU 140. Core 160 provides access to voice and data networks, such as Internet 170 and Public Switched Telephone Network (PSTN) 172.

In some embodiments, RAN 120 implements beamforming that allows for directional transmission or reception. 5G beamforming enables 5G connections to be more focused toward a receiving device. RAN 120 is further able to implement MIMO (Multiple Input Multiple Output), including mMIMO (massive MIMO), to provide an increase in throughput and signal-to-noise ratio (SNR). MIMO improves the radio link by using the multiple paths over which signals travel from the transmitter to the receiver. The multiple paths are de-correlated and this provides the opportunity to send multiple data streams over them.

Massive MIMO and dense small cell deployments are being implemented to improve radio resource efficiency. However, the intra-cell interference from neighboring cells presents a serious problem. According to some embodiments, the modeling of interference patterns in a Massive MIMO deployment is used to identify interfering beams between different sectors so that interference optimization techniques are able to be applied to address interference.

According to some embodiments, a northbound platform for the network is provided, such as a Service Management and Orchestration (SMO)/NMS 180. SMO 180 oversees the orchestration aspects, and the management and automation of RAN elements. SMO 180 supports O1, A1 and O2 interfaces. Non-RT RIC (non-Real-Time RAN Intelligent Controller) 182 enables non-real-time control and optimization of RAN elements and resources, AI/ML workflow including model training and updates, and policy-based guidance of applications/features in Near-RT RIC 184. Near-RT RIC 184 enables near-real-time control and optimization of O-RAN elements and resources via fine-grained data collection and actions over the E2 interface. Near-RT RIC 184 includes interpretation and enforcement of policies from Non-RT RIC 182, and supports enrichment information to optimize control function.

Near-RT RIC 184 obtains information associated with the beams that are passed to Non-RT RIC 182 and processed, for example, by an rApp at the Non-RT RIC 184, to generate an interference matrix. xApps are hosted on the Near-RT RIC 184 and are useable to optimize radio spectrum efficiency. rApps are specialized microservices operating on the Non-RT RIC 211. xApps and rApps provide control and management features and functionality.

AI-Based Network Management is able to be provided at the 5G Edge via the rApps in the Non-RT RIC 182. Data is collected by a Node, such as an O-CU 140. Collected Data is processed. The ML Model at the Non-RT RIC 182 is Trained/Optimized using the processed data from the database. By implementing AI-Based Network Management at the 5G EDGE, performance is adjusted through continuous learning, and failures are handled by model monitoring. Uses cases include one or more of anomaly detection, traffic classification, network slicing, mitigation of interference between beams or antennas, or between neighboring cell sites, control of electromagnetic emissions, prediction of user and traffic distribution patterns, derivation of the optimal configuration of massive MIMO parameters of cells or beams, maximization of RAN sharing, maintenance of efficient operation through performance diagnostics, assurance of end-to-end Service Level Agreements (SLAs), and the like.

Figure 2:
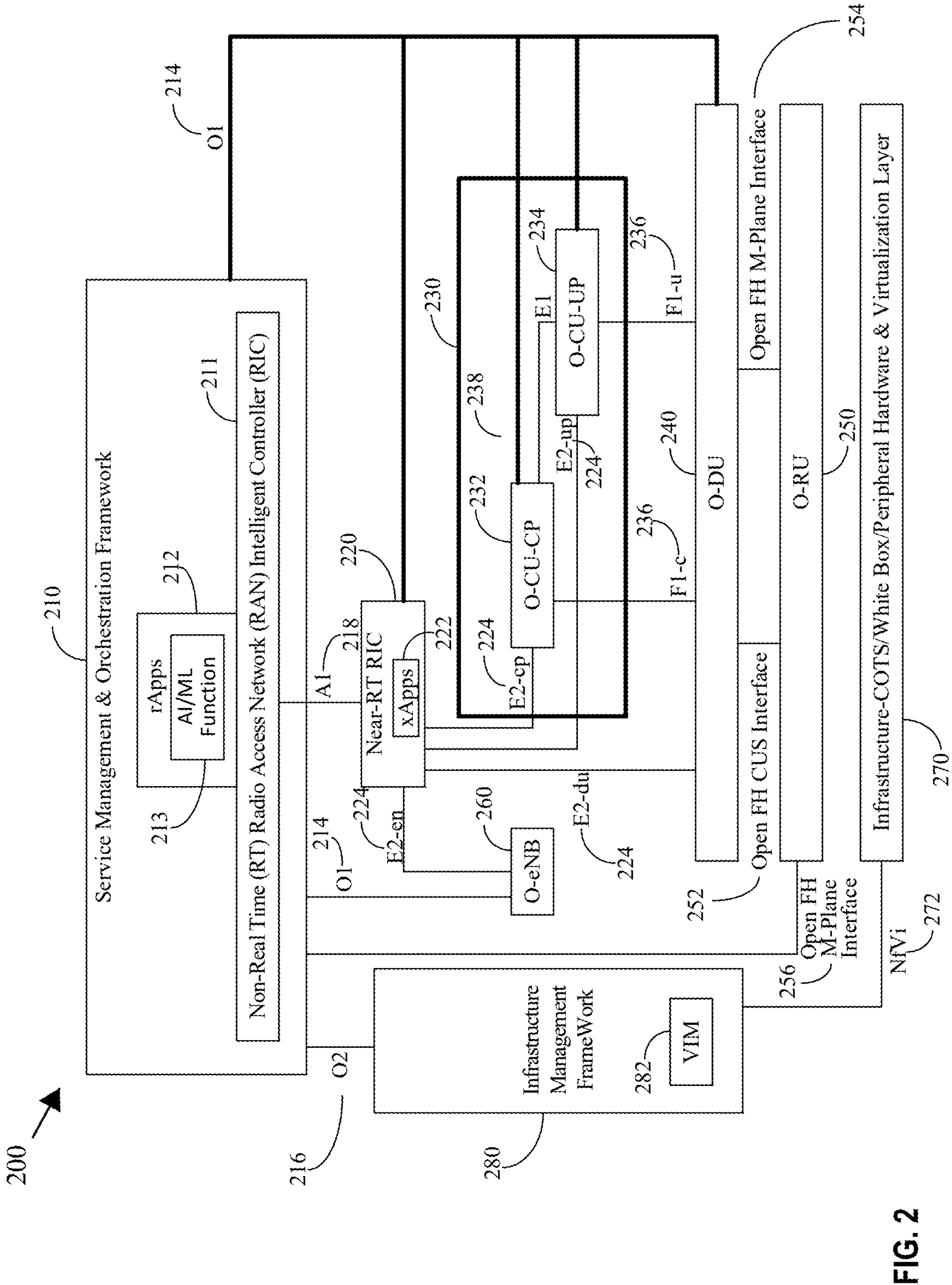
FIG. 2 is a block diagram of an Open Radio Access Network (O-RAN) according to some embodiments.

FIG. 2 is a block diagram of an Open Radio Access Network (O-RAN) 200 according to some embodiments.

In FIG. 2, Service Management and Orchestration (SMO) Framework 210 is an automation platform for Open RAN Radio Resources. SMO 210 oversees lifecycle management of network functions as well as O-Cloud. SMO 210 includes a Non-Real-Time (RT) Radio Access Network (RAN) Intelligent Controller (RIC) 211. SMO 210 further defines various SMO interfaces, such as the O1 214, O2 216, and A1 218 interfaces.

The A1 interface 218 enables communication between the Non-RT RIC 211 and a Near-RT RIC 220 and supports policy management, data transfer, and machine learning management. The A1 interface 218 is further used for policy guidance. SMO 210 provides fine-grained policy guidance such as getting User-Equipment to change frequency, and other data enrichments to RAN functions over the A1 interface 218.

The O1 214 interface connects the SMO 210 to the RAN managed elements, which include the Near-RT RIC 220, O-RAN Centralized Unit (O-CU) 230, O-RAN Distributed Unit (O-DU) 240, and the Open Evolved NodeB (O-eNB) 260. The management and orchestration functions are received by the managed elements via the O1 interface 214. The SMO 210 in turn receives data from the managed elements via the O1 interface 214 for AI model training at the Non-RT RIC 211. The O1 interface 214 is further used for managing the operation and maintenance (OAM) of multi-vendor Open RAN functions including fault, configuration, accounting, performance and security management, software management, and file management capabilities.

The O2 interface 216 is used to support cloud infrastructure management and deployment operations with O-Cloud infrastructure that hosts the Open RAN functions in the network. The O2 interface 216 supports orchestration of O-Cloud infrastructure resource management (e.g., inventory, monitoring, provisioning, software management and lifecycle management) and deployment of the Open RAN network functions, providing logical services for managing the lifecycle of deployments that use cloud resources.

SMO 210 provides a common data collection platform for management of RAN data as well as mediation for the O1 214, O2 216, and A1 218 interfaces. Licensing, access control and AI/ML lifecycle management are supported by the SMO 210, together with legacy north-bound interfaces. SMO 210 further supports existing OSS functions, such as service orchestration, inventory, topology, and policy control.

The Non-RT RIC 211 enables non-real-time (>1 second) control of RAN elements and their resources through cloud-native microservice-based applications, which are referred to as rApps 212. An rApp 212 implements an AI/ML Function 213. Non-RT RIC 211 communicates with applications called xApps 222 running on a Near-RT RIC 211 to provide policy-based guidance for edge control of RAN elements and their resources. The Non-RT RIC 211 provides non-real-time control and optimization of RAN elements and resources, AI/ML workflow, including model training of the AI/ML Function 213, updates, and policy-based guidance of applications/features in Near-RT RIC 220.

Near-RT RIC 220 controls RAN infrastructure at the cloud edge. Near-RT RIC 220 controls RAN elements and resources with optimization actions that typically take 10 milliseconds to one second to complete. The Near-RT RIC 220 receives policy guidance from the Non-RT RIC 211 and provides policy feedback to the Non-RT RIC 211 through the xApps 222.

The xApps 222 are used to enhance the RAN's spectrum efficiency. The Near-RT RIC 220 manages a distributed collection of "southbound" RAN functions, and further provides "northbound" interfaces for operators: the O1 214 and A1 218 interfaces to the non-RT RIC 211 for the management and optimization of the RAN. The Near-RT RIC 220 is thus able to self-optimize across different RAN types, like macros, Massive MIMO, and small cells, maximizing network resource utilization for 5G network scaling.

Within the Near-RT RIC 220, the xApps 222 communicate via defined interface channels. An internal messaging infrastructure provides the framework to handle conflict mitigation, subscription management, app lifecycle management functions, and security. Data transfers are implemented via the E2 interface.

The O-RAN is split into a Central Unit (CU) 230, a Distributed Unit (DU) 240, and a Radio Unit (RU) 250. The CU 230 is further split into two logical components, one for the Control Plane (CP) 232, and one for the User Plane (UP) 234. The logical split of the CU 230 into the CP 232 and UP 234 allows different functionalities to be deployed at different locations of the network, as well as on different hardware platforms. For example, CUs 230 and DUs 240 can be virtualized on white box servers at the edge, while the RUs 250 are implemented on Field Programmable Gate Arrays (FPGAs) and Application-specific Integrated Circuits (ASICs) boards and deployed close to RF antennas.

The O-RAN Distributed Unit (O-DU) 240 is an edge server that includes baseband processing and radio frequency (RF) functions. The O-DU 240 hosts radio link control (RLC), MAC, and a physical layer with network function virtualization or containers. O-DU 240 supports one or more cells, and the O-DUs are able to support one or more beams to provide the operating support for O-RU 250 by CUS (Control, User, and Synchronization) planes 252, and management (M) planes 254 through front-haul interfaces.

The O-RU 250 processes radio frequencies received by the physical layer of the network. The processed radio frequencies are sent to the O-DU 240 through fronthaul interfaces 252, 254. The O-RU 250 hosts the lower PHY Layer Baseband Processing and RF Front End (RF FE) and is designed to support multiple 3GPP split options.

An Open-Evolved Node B (O-eNB) 260 provides the hardware aspect of the O-RAN. The management and orchestration functions are received by the managed elements via the O1 interface 214. The SMO 210 in turn receives data from the managed elements via the O1 interface 214 for AI model training of AI/ML Functions 213 implemented by rApps 213 at non-RT RIC 211. The O-eNB 260 communicates with the Near-RT RIC 220 via the E2 interface 224. E2 224 enables near-real-time loops through the streaming of telemetry from the RAN and the feedback with control from the Near-RT RIC 220. The E2 interface 224 connects the Near-RT RIC 220 with an E2 node, such as the O-CU-CP 232, O-CU-UP 234, the O-DU 240, and the O-eNB 260. An E2 node is connected to one Near-RT RIC 220, while a Near-RT RIC is connected to multiple E2 nodes. The protocols over the E2 interface 224 are based on the control plane and supports services and functions of Near-RT RIC 220.

An F1 Interface 236 connects the O-CU-CP 232 and the O-CU-UP 234 to the O-DU 240. Thus, the F1 interface 236 is broken into control and user plane subtypes and exchanges data about the frequency resource sharing and other network statuses. One O-CU 230 can communicate with multiple O-DUs 240 via F1 interfaces 236.

An E1 238 interface connects the O-CU-CP 232 and the O-CU-UP 234. The E1 Interface 238 is used to transfer configuration data and capacity information between the O-CU-CP 232 and the O-CU-UP 234. The configuration data ensures the O-CU-CP 232 and the O-CU-UP 234 interoperate. The capacity information is sent from the O-CU-UP 234 to the O-CU-CP 232 and includes the status of the O-CU-UP 234.

The O-DU 240 communicates with the O-RU 250 via an Open Fronthaul (FH) Control, User, and Synchronization (CUS) Plane Interface 252 and an M-Plane (Management Plane) Interface 254. As part of the CUS Plane Interface 252, the C-Plane (control plane) is a frame format that carries data in real-time control messages between the O-DU 240 and O-RU 250 for use to control user data scheduling, beamforming weight selection, numerology selection, etc. Control messages are sent separately for downlink (DL)-related commands and uplink (UL)-related commands.

The U-Plane carries the user data messages between the O-DU 240 and O-RU 250, such as the in-phase and quadrature-phase (IQ) sample sequence of the orthogonal frequency division multiplexing (OFDM) signal. The S-plane includes synchronization messages used for timing synchronization between O-DU 240 and O-RU 250. The Control and User Plane are further useable to send information specifying beamforming weights from the O-DU 240 to O-RU 250. Other information includes time resource and frequency resource information.

The M-Plane 254 connects the O-RU 250 to the O-DU 240, and an optional M-Plane 256 connects the O-RU 250 to the SMO 210. The O-DU 240 uses the M-Plane 254 to manage the O-RU 250, while the SMO 210 provides FCAPS (Fault, Configuration, Accounting, Performance, Security) services to the O-RU 250. The M-plane 254 supports the management features including startup installation, software management, configuration management, performance management, fault management and file management.

The M-Plane 254 is used by the O-DU 240 to retrieve the capabilities of the O-RU 250 and to send relevant configuration related to the C-Plane and U-Plane (data plane) to the O-RU 250. Together the O1 214 and Open-Fronthaul M-plane 254 interfaces provide a FCAPS interface with configuration, reconfiguration, registration, security, performance, monitoring aspects exchange with individual nodes, such as O-CU-CP 232, O-CU-UP 234, O-DU 240, and O-RU 250, as well as non-RT RIC 220.

Infrastructure-COTS/White Box/Peripheral Hardware & Virtualization Layer 270 connects to Infrastructure Management Framework 280 via Network Function Virtualization Interface (NFVI) 272. Virtualized Infrastructure Manager (VIM) 282 at Infrastructure Management Framework 280 controls and manages virtual network functions.

Figure 3:
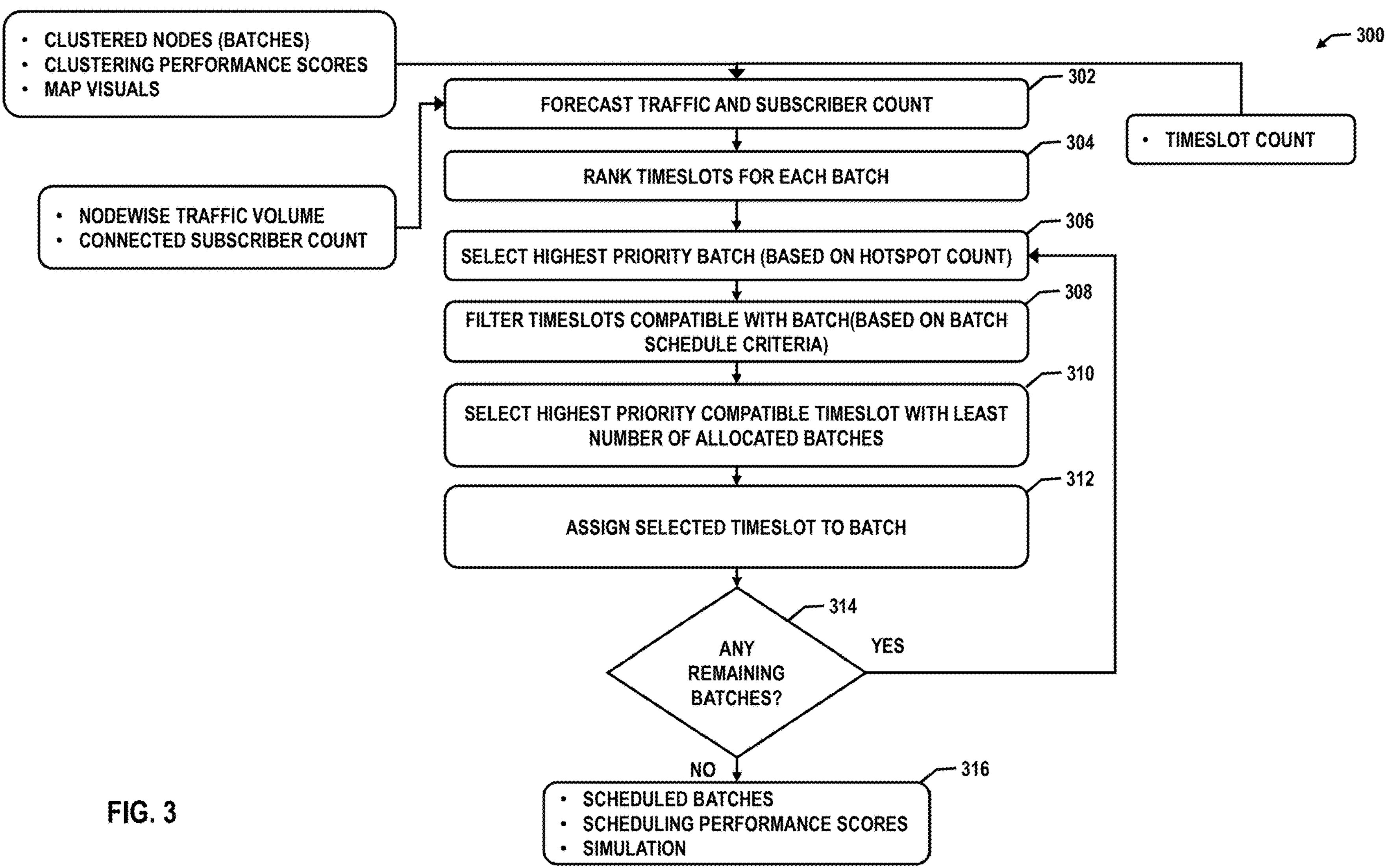
FIG. 3 is a flowchart of a method for node batch scheduling (NBS) according to some embodiments.

FIG. 3 is a flowchart 300 of a method for node batch scheduling (NBS) according to some embodiments.

In some embodiments, NBS method 300 describes process tasks for node batch scheduling for firmware or software updates as part of a smart scheduler architecture. While the operations of NBS method 300 are discussed and shown as having a particular order, each operation in NBS method 300 is configured to be performed in any order unless specifically called out otherwise. NBS method 300 is implemented as a set of operations, such as operations 302 through 316.

In some embodiments, NBS method 300 is a batch (a cluster) scheduling operation for the smart scheduler. In some embodiments, NBS method 300 is configured with a set of criteria that determine time scheduling for batches of radio nodes which satisfy certain criteria to be prioritized in a schedule.

In some embodiments, a first criterion is that multiple primary batches are unable to be shut down at the same time. However, in response to a primary batch being split into multiple, secondary batches (as noted above, secondary batches are portions or slices of primary batches that have already satisfied a batch distribution criteria (not discussed herein), but have been broken down into smaller portions or slices to accommodate a user-request to increase the number of batches) then those multiple secondary batches are able to be shut down together at the same time because the primary batch has already satisfied the batch distribution criteria. Primary batches are unable to be shut down at the same time as the second condition of the batch distribution criteria (e.g., one node cannot be used as both source node (a node being shut down for firmware or software updating) and a neighbor node (a node compensating for a source node) at the same time) being violated becomes highly likely.

In some embodiments, a second criterion is each batch is assigned to a timeslot with minimal traffic and minimal connected subscribers so that the impact of shutting the batch down is reduced to a minimum.

In some embodiments, a third criterion is batches are sequentially prioritized based on a batch hotspot count while allocating timeslots. For example, NBS method 300 assigns a first timeslot with the lowest traffic and connected subscriber count to a batch with the highest number of hotspots. In some embodiments, the batch hotspot count is a dictating factor in considering which batch is assigned the timeslot.

In some embodiments, a fourth criterion is, for each batch, each timeslot is sequentially prioritized based on minimal traffic and minimal connected subscriber. Each batch is checking the timeslots and the one having the lowest traffic and lowest connected subscriber count (or expected subscriber count) is prioritized.

In some embodiments, a fifth criterion applies in response to multiple batches having the same top ranked timeslot. In the event multiple batches have the same top ranked timeslot, then the batch with the highest hotspot count is prioritized. So, in response to three primary batches having the same top timeslot, a determination is made as to which batch has the higher number of hotspots. The batch with the higher number of hotspots is given the top timeslot, and for the other batches the second or third timeslots are prioritized.

In some embodiments, a scheduling performance indicator is a numerical representation of how close the allocated timeslots are compared to the corresponding target timeslots (target timeslots are the ranked timeslots for each batch where the target timeslot is the top timeslot for the batch) for each batch. In some embodiments, the scheduling performance indicator is a score of how close each batch came to the target timeslot. In a non-limiting example, in response to each batch being assigned the target timeslot, schedule performance is at or near 100%. In another non-limiting example, in response to each batch being assigned the lowest ranked timeslot possible for each batch, then schedule performance is at or near 0%. In some embodiments, there are situations when a batch is unable to obtain the top timeslot (e.g., a batch has no hotspots (thus a lower batch priority), a limited number of timeslots (a scenario where there are seven batches and seven timeslots meaning one batch is assigned the lowest timeslot), and the like) and the batch schedule criteria prevent the batch being assigned the top timeslot. So, the scheduling performance is a determination as to the ranking of the timeslot that is being assigned to that batch. In some embodiments, aggregating those rankings for the batches provides the overall scheduling performance.

At operation 302 of NBS method 300, the traffic and connected subscriber count are forecasted. In some embodiments, in response to user input through a UI of a scheduling start time and the total number of timeslots, a scheduling duration (e.g., total time to perform the firmware or software update for all batches) is determined. For the scheduling duration, a ML model forecasts the traffic and subscriber count for the radio nodes that are to be updated with firmware or software based on historical time series data. The batchwise traffic and connected subscriber count (e.g., the traffic and subscriber count for an entire batch of nodes) is determined by aggregating (averaging) the nodewise forecasted output (e.g., the forecasted traffic and subscriber count for each node) from the ML model.

In some embodiments, connected subscriber count and traffic is forecasted. In some embodiments, the traffic and subscriber count is forecasted using a focused ML algorithm like long short-term memory (LSTM is an artificial neural network having feedback connections that process not only single data points, but also entire sequences of data for processing and predicting data) or using piecewise linear regression (in response to the data following different linear trends over different regions of the data, model the regression function in pieces). In some embodiments, this is forecasting the future timeslots based on the historical data (e.g., the last seven days or fifteen days). Process flows from operation 302 to operation 304.

At operation 304 of NBS method 300, once the traffic and connected subscriber counts are forecasted, the timeslots available for the scheduling duration are ranked for each batch. The timeslots are ranked in descending order based on an increase in traffic and subscriber count. Thus, a timeslot with very low traffic and a very low connected subscriber count ranks higher than a timeslot with moderate traffic and a moderate number of connected subscribers. Process flows from operation 304 to operation 306.

At operation 306 of NBS method 300, the highest priority batch is selected based on hotspot count by a scheduling algorithm. For example, the batch with the largest number of hotspots is given the highest priority and selected first by the scheduling algorithm. Process flows from operation 306 to operation 308.

At operation 308 of NBS method 300, the scheduling algorithm filters the ranked timeslots from the ranked timeslots for the batch selected in operation 306 and determines which timeslots are compatible based upon the batch criteria. In some embodiments, a compatibility check ensures that the filtered timeslots fulfill each of the criteria for an individual batch. The scheduling algorithm is applied to assign the highest ranked filtered timeslot to each batch. In a non-limiting example, the highest ranked filtered timeslot is a timeslot, relative to a single batch, having no traffic and no subscribers. However, for some batches a zero traffic and zero subscriber scenario are not possible and so a highest ranked filtered timeslot is a timeslot, during the scheduling duration, having the least amount of traffic and least amount of connected subscribers. Process flows from operation 308 to operation 310.

At operation 310 of NBS method 300, the scheduling algorithm selects the highest priority compatible timeslot with the least number of allocated batches. In response to the batch selected in operation 306 being the first batch selected, then there are no allocated batches. In response to the batch selected in operation 306 being a secondary batch, there is a possibility that several high priority timeslots are allocated to other secondary batches. In this event, the highest priority timeslot with the lowest number of allocated secondary batches is selected. According to the first criterion, primary batches are unable to occupy the same timeslot. In some embodiments, as discussed above, timeslots are assigned to multiple batches in response to the multiple batches being secondary batches. In some embodiments, the highest priority timeslot is in terms of lowest traffic and lowest subscriber count. Process flows from operation 310 to operation 312.

At operation 312 of NBS method 300, the scheduling algorithm assigns the selected timeslot to a batch selected in operation 310. Process flows from operation 312 to operation 314.

At operation 314 of NBS method 300, the scheduling algorithm determines whether there are any remaining batches that are unassigned to a timeslot. In response to there being remaining batches unassigned to a timeslot, process flows to operation 306 and the scheduling algorithm selects the next highest priority batch (e.g., a batch with the next highest hotspot count) that is unassigned, and the process iterates until each batch has an assigned timeslot.

Figure 4:
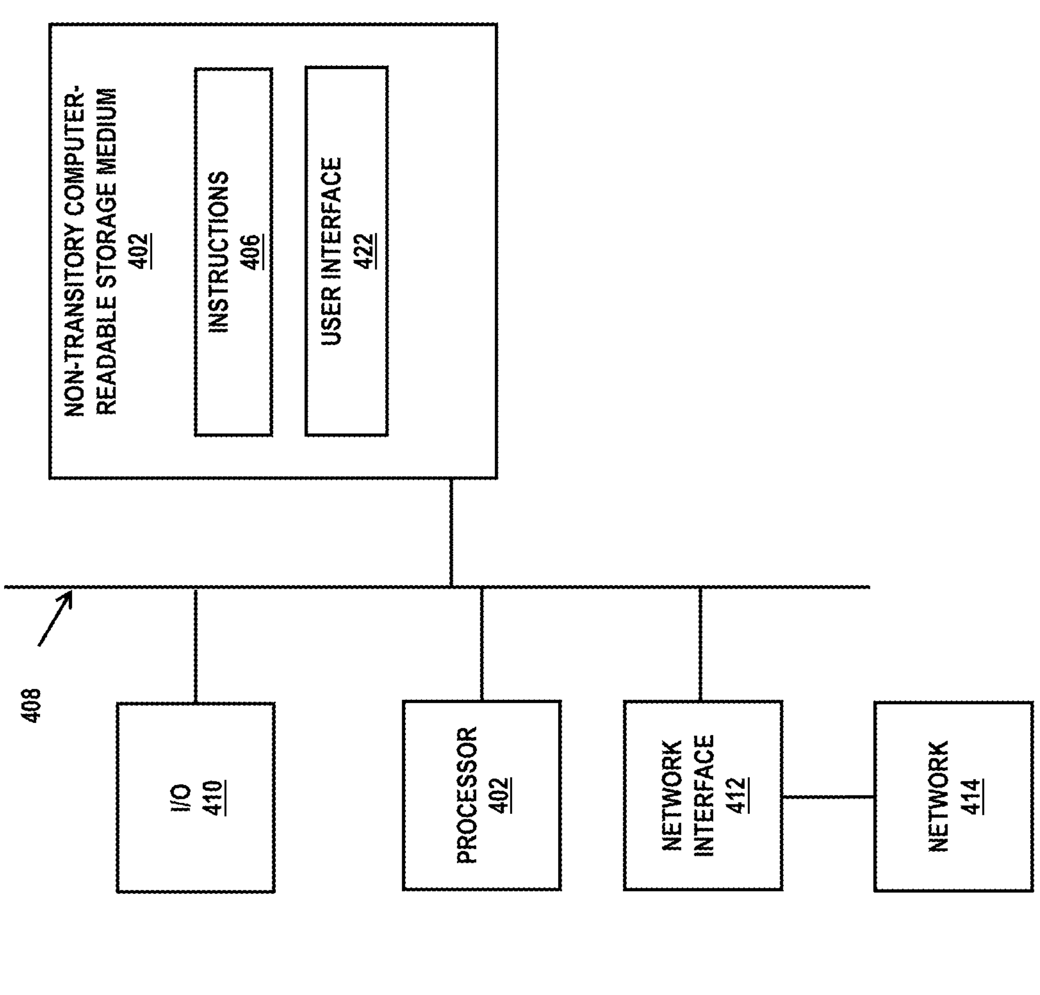
FIG. 4 is a high-level functional block diagram of a processor-based system according to some embodiments.

In response to there not being any remaining batches that are unassigned to a timeslot, then process flows to operation 316, the scheduling algorithm terminates, the scheduling is complete, and the scheduling algorithm outputs scheduled batches, scheduling performance scores, and a simulation the user is able to run through a UI, such as UI 422 (FIG. 4). In at least one embodiment, implementation of an action for each of the one or more nodes in the highest priority batch during the highest priority timeslot is automatically scheduled.

In some embodiments, a scheduling score calculation is performed. A timeslot rank ratio (TSRR) for a batch, which is the rank of the allocated timeslot scheduled compared to the rank of the least priority timeslots of operation 304. In a non-limiting example, in response to there being seven timeslots (so the lowest rank is seven) and a batch is allocated the third timeslot to that batch, then the TSRR is $$\frac{3}{7} = .\overline{428571}.$$

In some embodiments, the scheduling risk is determined by averaging TSRRs. Continuing with the non-limiting example, an average TSRR of the seven batches is determined. In a non-limiting example, in response to the average TSRR being 0.07, then the scheduling risk is 7%. Further, the scheduling performance (e.g., 1-the scheduling performance) is 0.93 or 93%. Thus, informing the user most each batch was scheduled in the highest priority timeslot and the firmware or software update has minimal risk, a 7% risk, of coverage blackout, a steep drop in handover success, or the like.

In some embodiments, a user is able to modify the number of timeslots. In a non-limiting example, in response to a user determining the scheduling risk is too high, the user is able to increase the number of timeslots, which increases the odds that each batch is able to select a high priority timeslot. The schedule risk score increases or decreases based on the number of assigned timeslots.

In a non-limiting example, in response to increasing the number of timeslots to 150, depending on the number of batches, the schedule risk score decreases to near zero. While the scheduling duration grows significantly, the opportunity for high-ranking timeslots increases as well. Continuing with the non-limiting example, in response to decreasing the number of timeslots to 10, the schedule risk increases to 10%. Thus, while the scheduling duration decreases significantly, the number of high-ranking timeslots decreases as well.

In table 1 below, the secondary_batch column displays secondary batches 1.0 through 12.0. Each secondary batch includes a hotspot count for each batch in the hotspot_count column. Hotspot_count_ratio column displays a ratio of the hotspot count for each batch compared to the total hotspot count for the secondary batches. Schedule_risk column displays the schedule risk (the average TSRR) for each secondary batch. Batch_level_schedule_risk_ratio column displays TSRRs that are almost zero, which indicates the schedule performance is at or near 100% and the schedule risk is at or near 0%. Schedule_risk column indicates, for table 1, the schedule risk is 1%, which means the schedule performance (1-schedle risk) is 99%.

As $$TSRR_{Batch} = \frac{\text{Rank}_{Allocated\ Timeslot}}{\text{Rank}_{Least\ Priority\ Timeslot}},$$

and the lowest TSRR is 0.009174 the number of timeslots is determinable. For example $$0.009174 = \frac{1}{\text{Rank}_{Least\ Priority\ Timeslot}},$$

which is $$\text{Rank}_{Least\ Priority\ Timeslot} = \frac{1}{0.009174},$$

which is 109 timeslots.

TABLE 1

Example TSRR Output

| | secondary_batch | hotspot_count | hotspot_count_ratio | schedule_risk | batch_level_schedule_risk_ratio |
|---|---|---|---|---|---|
| 0 | 1.0 | 52.0 | 0.120370 | 1 | 0.009174 |
| 1 | 2.0 | 51.0 | 0.118056 | 1 | 0.009174 |
| 2 | 3.0 | 52.0 | 0.120370 | 1 | 0.009174 |
| 3 | 4.0 | 40.0 | 0.092593 | 1 | 0.009174 |
| 4 | 5.0 | 49.0 | 0.113426 | 1 | 0.009174 |
| 5 | 6.0 | 58.0 | 0.134259 | 1 | 0.009174 |
| 6 | 7.0 | 45.0 | 0.104167 | 1 | 0.009174 |
| 7 | 8.0 | 33.0 | 0.076389 | 1 | 0.009174 |
| 8 | 9.0 | 17.0 | 0.039352 | 2 | 0.018349 |
| 9 | 10.0 | 26.0 | 0.060185 | 1 | 0.009174 |
| 10 | 11.0 | 6.0 | 0.013889 | 1 | 0.009174 |
| 11 | 12.0 | 3.0 | 0.006944 | 1 | 0.009174 |

FIG. 4 is a high-level functional block diagram of a processor-based system 400 according to some embodiments.

In some embodiments, processor-based system 400 is a general-purpose computing device including a hardware processor 402 and a non-transitory, computer-readable storage medium 404. Storage medium 404, amongst other things, is encoded with, i.e., stores, computer program code 406, i.e., a set of executable instructions such as an algorithm, or method 300. Execution of instructions 406 by hardware processor 402 represents (at least in part) a batch scheduling algorithm which implements a portion, or all the methods described herein in accordance with one or more embodiments (hereinafter, the noted processes and/or methods).

Processor 402 is electrically coupled to the computer-readable storage medium 404 via a bus 408. Processor 402 is further electrically coupled to an I/O interface 410 by bus 408. A network interface 412 is further electrically connected to processor 402 via bus 408. Network interface 412 is connected to a network 414, so that processor 402 and computer-readable storage medium 404 connect to external elements via network 414. Processor 402 is configured to execute computer program code 406 encoded in computer-readable storage medium 404 to cause processor-based system 400 to be usable for performing a portion or all the noted processes and/or methods. In one or more embodiments, processor 402 is a central processing unit (CPU), a multi-processor, a distributed processing system, an application specific integrated circuit (ASIC), and/or a suitable processing unit.

In one or more embodiments, computer-readable storage medium 404 is an electronic, magnetic, optical, electromagnetic, infrared, and/or a semiconductor system (or apparatus or device). For example, computer-readable storage medium 404 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 404 includes a compact disk-read only memory (CD-ROM), a compact disk-read/write (CD-R/W), and/or a digital video disc (DVD).

In one or more embodiments, storage medium 404 stores computer program code 406 configured to cause processor-based system 400 to be usable for performing a portion or all the noted processes and/or methods. In one or more embodiments, storage medium 404 further stores information, such as an algorithm which facilitates performing a portion or all the noted processes and/or methods.

Processor-based system 400 includes I/O interface 410. I/O interface 410 is coupled to external circuitry. In one or more embodiments, I/O interface 410 includes a keyboard, keypad, mouse, trackball, trackpad, touchscreen, and/or cursor direction keys for communicating information and commands to processor 402.

Processor-based system 400 further includes network interface 412 coupled to processor 402. Network interface 412 allows processor-based system 400 to communicate with network 414, to which one or more other computer systems are connected. Network interface 412 includes wireless network interfaces such as BLUETOOTH, WIFI, WIMAX, GPRS, or WCDMA; or wired network interfaces such as ETHERNET, USB, or IEEE-864. In one or more embodiments, a portion or all noted processes and/or methods, are implemented in two or more processors 402.

Processor-based system 400 is configured to receive information through I/O interface 410. The information received through I/O interface 410 includes one or more of instructions, data, rules, and/or other parameters for processing by processor 402. The information is transferred to processor 402 via bus 408. Processor-based system 400 is configured to receive information related to user-interface (UI) 422 through I/O interface 410. The information is stored in computer-readable medium 404 as user interface (UI) 422.

In some embodiments, a portion or all the noted processes and/or methods is implemented as a standalone software application for execution by a processor. In some embodiments, a portion or all the noted processes and/or methods is implemented as a software application that is a part of an additional software application. In some embodiments, a portion or all the noted processes and/or methods is implemented as a plug-in to a software application.

[1] An aspect of this description is directed to a method that includes selecting a highest priority batch, based on a hotspot count, from a list of unassigned batches, wherein each batch includes one or more nodes in a telecommunication network; selecting a highest priority timeslot, based on batch traffic and batch connected subscriber count, for the highest priority batch; assigning the highest priority timeslot to the highest priority batch; and automatically scheduling implementation of an action for each of the one or more nodes in the highest priority batch during the highest priority timeslot.

[2] The method described in [1], further includes, before selecting the highest priority batch, determining the batch traffic and the batch connected subscriber count for a scheduling duration, wherein the scheduling duration includes a firmware update start time, a timeslot duration for each firmware update, and a total number of timeslots.

[3] The method described in any of [1] to [2], further includes, in response to determining the batch traffic and the batch connected subscriber count for the scheduling duration, ranking each timeslot from the total number of timeslots for each batch.

[4] The method described in any of [1] to [3], further includes, in response to selecting the highest priority batch, filtering the ranked timeslots based on a batch schedule criteria.

[5] The method described in any of [1] to [4], where the filtering of the ranked timeslots based on the batch schedule criteria includes assigning the highest priority batch to a timeslot having a lowest batch traffic or lowest batch connected subscriber count of the ranked timeslots.

[6] The method described in any of [1] to [5], where the filtering of the ranked timeslots based on the batch schedule criteria further includes, in response to the highest priority batch being a primary batch, preventing overlap of another primary batch at a same timeslot; and in response to the highest priority batch being a secondary batch, allowing overlap of another secondary batch at the same timeslot.

[7] The method described in any of [1] to [6], further includes, in response to the assigning of the highest priority timeslot to the highest priority batch, determining whether one or more unassigned batches remain; and in response to the one or more unassigned batches remaining, selecting a second highest priority batch, based on the hotspot count, from the list of unassigned batches.

[8] The method described in any of [1] to [7], further includes, in response to no unassigned batches remaining, outputting to a user interface, one or more of a listing of scheduled batches and each corresponding timeslot for each scheduled batch; an overall schedule performance score based on a ratio of assigned timeslots compared to target timeslots, wherein the target timeslots are timeslots with the lowest batch traffic or the lowest batch connected subscriber count; or an executable simulation of the firmware update based on the scheduled batches.

[9] An aspect of this description is directed to an apparatus configured to select a highest priority batch, based on a hotspot count, from a list of unassigned batches, wherein each batch includes one or more nodes in a telecommunication network; select a highest priority timeslot, based on batch traffic and batch connected subscriber count, for the highest priority batch; assign the highest priority timeslot to the highest priority batch; and automatically schedule implementation of an action for each of the one or more nodes in the highest priority batch during the highest priority timeslot.

[10] The apparatus described in [9], further configured to, before selecting the highest priority batch, determine the batch traffic and the batch connected subscriber count for a scheduling duration, wherein the scheduling duration includes a firmware update start time, a timeslot duration for each firmware update, and a total number of timeslots.

[11] The apparatus described in any of [9] to [10], configured to in response to determining the batch traffic and the batch connected subscriber count for the scheduling duration, rank each timeslot from the total number of timeslots for each batch.

[12] The apparatus described in any of [9] to [11], further configured to in response to selecting the highest priority batch, filter the ranked timeslots based on a batch schedule criteria.

[13] The apparatus described in any of [9] to [12], further configured to filter the ranked timeslots based on the batch schedule criteria by assigning the highest priority batch to a timeslot having a lowest batch traffic or lowest batch connected subscriber count of the ranked timeslots.

[14] The apparatus described in any of [9] to [13], further configured to filter the ranked timeslots based on the batch schedule criteria by, in response to the highest priority batch being a primary batch, preventing overlap of another primary batch at a same timeslot; and in response to the highest priority batch being a secondary batch, allow overlap of another secondary batch at the same timeslot.

[15] The apparatus described in any of [9] to [14], further configured to, in response to the assigning of the highest priority timeslot to the highest priority batch, determine whether one or more unassigned batches remain; and in response to the one or more unassigned batches remaining, select a second highest priority batch, based on the hotspot count, from the list of unassigned batches.

[16] The apparatus described in any of [9] to [15], further configured to, in response to no unassigned batches remaining, output to a user interface one or more of a listing of scheduled batches and each corresponding timeslot for each scheduled batch; an overall schedule performance score based on a ratio of assigned timeslots compared to target timeslots, wherein the target timeslots are timeslots with the lowest batch traffic or the lowest batch connected subscriber count; or an executable simulation of the firmware update based on the scheduled batches.

[17] An aspect of this description is directed to a non-transitory computer-readable media having computer-readable instructions stored thereon, which when executed perform operations to select a highest priority batch, based on a hotspot count, from a list of unassigned batches, wherein each batch includes one or more nodes in a telecommunication network; select a highest priority timeslot, based on batch traffic and batch connected subscriber count, for the highest priority batch; assign the highest priority timeslot to the highest priority batch; and automatically schedule implementation of an action for each of the one or more nodes in the highest priority batch during the highest priority timeslot.

[18] The non-transitory computer-readable media described in [17], where the computer-readable instructions further perform operations to before selecting the highest priority batch, determine the batch traffic and the batch connected subscriber count for a scheduling duration, wherein the scheduling duration includes a firmware update start time, a timeslot duration for each firmware update, and a total number of timeslots.

[19] The non-transitory computer-readable media described in any of to [18], where the computer-readable instructions further perform operations to, in response to determining the batch traffic and the batch connected subscriber count for the scheduling duration, rank each timeslot from the total number of timeslots for each batch.

[20] The non-transitory computer-readable media described in any of to [19], where the computer-readable instructions further perform operations to, in response to selecting the highest priority batch, filter the ranked timeslots based on a batch schedule criteria.

Separate instances of these programs can be executed on or distributed across any number of separate computer systems. Thus, although certain operations have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method, comprising:

selecting a highest priority batch, based on a hotspot count, from a list of unassigned batches, wherein each batch includes one or more nodes in a telecommunication network;

selecting a highest priority timeslot, based on batch traffic and batch connected subscriber count, for the highest priority batch;

assigning the highest priority timeslot to the highest priority batch; and automatically scheduling implementation of an action for each of the one or more nodes in the highest priority batch during the highest priority timeslot.

2. The method of claim 1, further comprising:

before selecting the highest priority batch, determining the batch traffic and the batch connected subscriber count for a scheduling duration, wherein the scheduling duration includes a firmware update start time, a timeslot duration for each firmware update, and a total number of timeslots.

3. The method of claim 2, further comprising:

in response to determining the batch traffic and the batch connected subscriber count for the scheduling duration, ranking each timeslot from the total number of timeslots for each batch.

4. The method of claim 3, further comprising:

in response to selecting the highest priority batch, filtering the ranked timeslots based on a batch schedule criteria.

5. The method of claim 4, wherein the filtering of the ranked timeslots based on the batch schedule criteria comprises:

assigning the highest priority batch to a timeslot having a lowest batch traffic or lowest batch connected subscriber count of the ranked timeslots.

6. The method of claim 5, wherein the filtering of the ranked timeslots based on the batch schedule criteria further comprises:

in response to the highest priority batch being a primary batch, preventing overlap of another primary batch at a same timeslot; and in response to the highest priority batch being a secondary batch, allowing overlap of another secondary batch at the same timeslot.

7. The method of claim 6, further comprising:

in response to the assigning of the highest priority timeslot to the highest priority batch, determining whether one or more unassigned batches remain; and in response to the one or more unassigned batches remaining, selecting a second highest priority batch, based on the hotspot count, from the list of unassigned batches.

8. The method of claim 7, further comprising:

in response to no unassigned batches remaining, outputting to a user interface, one or more of:

a listing of scheduled batches and each corresponding timeslot for each scheduled batch;

an overall schedule performance score based on a ratio of assigned timeslots compared to target timeslots, wherein the target timeslots are timeslots with the lowest batch traffic or the lowest batch connected subscriber count; or an executable simulation of the firmware update based on the scheduled batches.

9. An apparatus configured to:

select a highest priority batch, based on a hotspot count, from a list of unassigned batches, wherein each batch includes one or more nodes in a telecommunication network;

select a highest priority timeslot, based on batch traffic and batch connected subscriber count, for the highest priority batch;

assign the highest priority timeslot to the highest priority batch; and automatically schedule implementation of an action for each of the one or more nodes in the highest priority batch during the highest priority timeslot.

10. The apparatus of claim 9, further configured to:

before selecting the highest priority batch, determine the batch traffic and the batch connected subscriber count for a scheduling duration, wherein the scheduling duration includes a firmware update start time, a timeslot duration for each firmware update, and a total number of timeslots.

11. The apparatus of claim 10, further configured to:

in response to determining the batch traffic and the batch connected subscriber count for the scheduling duration, rank each timeslot from the total number of timeslots for each batch.

12. The apparatus of claim 11, further configured to:

in response to selecting the highest priority batch, filter the ranked timeslots based on a batch schedule criteria.

13. The apparatus of claim 12, further configured to filter the ranked timeslots based on the batch schedule criteria by:

assign the highest priority batch to a timeslot having a lowest batch traffic or lowest batch connected subscriber count of the ranked timeslots.

14. The apparatus of claim 13, further configured to filter the ranked timeslots based on the batch schedule criteria further by:

in response to the highest priority batch being a primary batch, prevent overlap of another primary batch at a same timeslot; and in response to the highest priority batch being a secondary batch, allow overlap of another secondary batch at the same timeslot.

15. The apparatus of claim 14, further configured to:

in response to the assigning of the highest priority timeslot to the highest priority batch, determine whether one or more unassigned batches remain; and in response to the one or more unassigned batches remaining, select a second highest priority batch, based on the hotspot count, from the list of unassigned batches.

16. The apparatus of claim 15, further configured to:

in response to no unassigned batches remaining, output to a user interface one or more of:

a listing of scheduled batches and each corresponding timeslot for each scheduled batch;

an overall schedule performance score based on a ratio of assigned timeslots compared to target timeslots, wherein the target timeslots are timeslots with the lowest batch traffic or the lowest batch connected subscriber count; or an executable simulation of the firmware update based on the scheduled batches.

17. A non-transitory computer-readable media having computer-readable instructions stored thereon, which when executed perform operations to:

select a highest priority batch, based on a hotspot count, from a list of unassigned batches, wherein each batch includes one or more nodes in a telecommunication network;

select a highest priority timeslot, based on batch traffic and batch connected subscriber count, for the highest priority batch;

assign the highest priority timeslot to the highest priority batch; and automatically schedule implementation of an action for each of the one or more nodes in the highest priority batch during the highest priority timeslot.

18. The non-transitory computer-readable media of claim 17, wherein the computer-readable instructions further perform operations to:

before selecting the highest priority batch, determine the batch traffic and the batch connected subscriber count for a scheduling duration, wherein the scheduling duration includes a firmware update start time, a timeslot duration for each firmware update, and a total number of timeslots.

19. The non-transitory computer-readable media of claim 18, wherein the computer-readable instructions further perform operations to:

in response to determining the batch traffic and the batch connected subscriber count for the scheduling duration, rank each timeslot from the total number of timeslots for each batch.

20. The non-transitory computer-readable media of claim 19, wherein the computer-readable instructions further perform operations to:

in response to selecting the highest priority batch, filter the ranked timeslots based on a batch schedule criteria.

* * * * *